(12) United States Patent
Subramanian Rajalakshmi et al.

(10) Patent No.: US 11,556,460 B2
(45) Date of Patent: Jan. 17, 2023

(54) TEST CASE GENERATION FOR SOFTWARE DEVELOPMENT USING MACHINE LEARNING

(71) Applicant: Bank of America Corporation, Charlotte, NC (US)

(72) Inventors: Muthu Krishnan Subramanian Rajalakshmi, Chennai (IN); Arun Sriraman, Chennai (IN); MadhuSudhanan Krishnamoorthy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/459,148

(22) Filed: Aug. 27, 2021

(65) Prior Publication Data

US 2021/0390037 A1    Dec. 16, 2021

Related U.S. Application Data

(63) Continuation of application No. 16/834,566, filed on Mar. 30, 2020, now Pat. No. 11,144,435.

(51) Int. Cl.
  *G06F 11/36* (2006.01)
  *G06N 20/00* (2019.01)
(52) U.S. Cl.
  CPC ...... *G06F 11/3684* (2013.01); *G06F 11/3664* (2013.01); *G06N 20/00* (2019.01)
(58) Field of Classification Search
  None
  See application file for complete search history.

(56) References Cited

U.S. PATENT DOCUMENTS

| | | |
|---|---|---|
| 5,075,881 A | 12/1991 | Blomberg et al. |
| 5,655,074 A | 8/1997 | Rauscher |
| 5,694,540 A | 12/1997 | Humelsine et al. |
| 6,408,403 B1 | 6/2002 | Rodrigues et al. |
| 6,694,509 B1 | 2/2004 | Stoval et al. |
| 6,810,495 B2 | 10/2004 | Castelli et al. |

(Continued)

FOREIGN PATENT DOCUMENTS

WO    2015022890 A1    2/2015

OTHER PUBLICATIONS

Malik, Abid M., "Spatial Based Feature Generation for Machine Learning Based Optimization Compilation," IEEE, 2010, 6pg. (Year: 2010).*

(Continued)

*Primary Examiner* — Ryan D. Coyer

(57) ABSTRACT

A device is further configured to determine a location within a spatial domain for a first program. The device is further configured to determine a first distance threshold value that corresponds with a first distance away from the location of the first program within the spatial domain. The device is further configured to determine distances between the location of the first program and locations of other programs from the plurality of programs and to identify one or more programs from the plurality of programs that are less than the first distance threshold value. The device is further configured to identify the one or more programs from the plurality of programs that are less than the first distance threshold value.

20 Claims, 5 Drawing Sheets

(56) References Cited

U.S. PATENT DOCUMENTS

| | | |
|---|---|---|
| 6,966,013 B2 | 11/2005 | Blum et al. |
| 7,216,088 B1 | 5/2007 | Chappel et al. |
| 7,236,940 B2 | 6/2007 | Chappel |
| 7,437,446 B2 | 10/2008 | Bailey et al. |
| 7,660,705 B1 | 2/2010 | Meek et al. |
| 7,779,303 B2 | 8/2010 | Stubbs et al. |
| 7,818,275 B2 | 10/2010 | Bertrand et al. |
| 8,055,479 B2 | 11/2011 | Miller |
| 8,132,157 B2 | 3/2012 | Dhuvur et al. |
| 8,151,146 B2 | 4/2012 | Ostrand et al. |
| 8,175,843 B2 | 5/2012 | Kubiak et al. |
| 8,230,401 B2 | 7/2012 | Branca et al. |
| 8,276,126 B2 | 9/2012 | Farnham et al. |
| 8,381,197 B2 | 2/2013 | Meenakshisundaram et al. |
| 8,612,171 B2 | 12/2013 | Awedikian et al. |
| 8,745,572 B2 | 6/2014 | Zimmermann et al. |
| 8,812,911 B2 | 8/2014 | Plamondon |
| 8,832,640 B1 | 9/2014 | Roche |
| 9,032,361 B2 | 5/2015 | Dhalait |
| 9,152,921 B2 | 10/2015 | Chu et al. |
| 9,389,986 B2 | 7/2016 | Abraham et al. |
| 9,448,787 B2 | 9/2016 | Rosomoff |
| 9,542,176 B2 | 1/2017 | Bird et al. |
| 9,773,211 B2 | 9/2017 | Barker |
| 2005/0071807 A1 | 3/2005 | Yanavi |
| 2005/0204201 A1 | 9/2005 | Meenakshisundaram et al. |
| 2006/0107121 A1 | 5/2006 | Mendrala et al. |
| 2006/0212540 A1 | 9/2006 | Chon et al. |
| 2007/0006041 A1 | 1/2007 | Brunswig et al. |
| 2007/0061626 A1 | 3/2007 | Nelson et al. |
| 2007/0074149 A1 | 3/2007 | Ognev et al. |
| 2008/0313112 A1* | 12/2008 | Vapnik ............... G06N 20/00 708/401 |
| 2009/0265694 A1 | 10/2009 | Bakowski |
| 2010/0005341 A1 | 1/2010 | Agarwal et al. |
| 2011/0161936 A1 | 6/2011 | Huang et al. |
| 2012/0042302 A1 | 2/2012 | Sikandar et al. |
| 2012/0174058 A1* | 7/2012 | Winkler ............... G06F 8/33 717/105 |
| 2013/0111267 A1 | 5/2013 | Beryoza et al. |
| 2013/0346033 A1 | 12/2013 | Wang et al. |
| 2014/0013304 A1* | 1/2014 | Vangala ............... G06F 8/75 717/123 |
| 2014/0208288 A1 | 7/2014 | Wuchner |
| 2015/0082277 A1 | 3/2015 | Champlin-Scharff et al. |
| 2015/0220336 A1 | 8/2015 | Kannan et al. |
| 2015/0254172 A1 | 9/2015 | Baril et al. |
| 2016/0004985 A1 | 1/2016 | Blomberg et al. |
| 2016/0062876 A1 | 3/2016 | Narayanan |
| 2016/0246576 A1* | 8/2016 | Cory ............... G06F 8/36 |
| 2017/0068747 A1* | 3/2017 | Qi ............... G06F 11/3452 |
| 2019/0196803 A1* | 6/2019 | Purushothaman ........ G06F 8/61 |
| 2019/0243621 A1* | 8/2019 | Gass ............... G06F 8/427 |
| 2020/0104641 A1* | 4/2020 | Alvelda, VII ........... G06N 3/04 |
| 2020/0327505 A1* | 10/2020 | Gomes ............... G06Q 10/1053 |

OTHER PUBLICATIONS

Zhang et al., "Machine Learning and Software Engineering," Software Quality Journal, 2003, 33pg. (Year: 2003).*

Subramanian Rajalakshmi, M. K., "Test Case Generation for Software Development Using Machine Learning," U.S. Appl. No. 16/834,566, filed Mar. 30, 2020, 36 pages.

* cited by examiner

TEST CASE GENERATION FOR SOFTWARE DEVELOPMENT USING MACHINE LEARNING

CROSS-REFERENCE TO RELATED APPLICATIONS

This application is a continuation of U.S. patent application Ser. No. 16/834,566 filed Mar. 30, 2020, by Muthu Krishnan Subramanian Rajalakshmi et al., and entitled "TEST CASE GENERATION FOR SOFTWARE DEVELOPMENT USING MACHINE LEARNING," which is incorporated herein by reference.

TECHNICAL FIELD

The present disclosure relates generally to software development and management, and more specifically to test case generation for software development using machine learning.

BACKGROUND

In existing computing systems, determining relationships between multiple programs within a software development environment poses several technical challenges. For example, a typical software project may include numerous programs that are written using a combination of programming languages. Each of these programs may have thousands of lines of code which need to be correctly interpreted based on their respective programming language. This means that analyzing the code for the programs in a software project is a resource-intensive process. This process consumes a significant amount of processing power which reduces the computer system's ability to perform other processes, and thereby, reduces the throughput of the system. In addition, existing computer systems are unable to determine or represent how modifications to a program within a software project will impact other programs in the software project.

SUMMARY

The system disclosed in the present application provides a technical solution to the technical problems discussed above by employing machine learning to determine relationships between a set of programs. The disclosed system provides several practical applications and technical advantages which include a process for using machine learning to identify relationships between a set of programs regardless of the programming language they are written in. This process uses the machine learning model to reduce the amount of code that needs to be analyzed and interpreted by a computer system, which improves resource utilization and the throughput of the underlying computer system. The disclosed system also provides a process for determining how modifications to a particular program within a software project will impact other programs in the software project. This process improves software development technology by providing insight about how modifications to a program that will affect other programs. This process reduces the amount of time required to develop a software project by reducing downtime due to troubleshooting errors. This process improves the operation of the underlying computer system by identifying potential issues that may result in downtime and reducing the amount of time that the computer system's resources are occupied for developing software projects. In addition, this process also allows the programs and their impact on each other to be visualized graphically. The disclosed system also provides a process for using machine learning to generate test case information that includes information about various software testing configurations that can be used to test the result of modifications to a program. This process also improves software development technology by automatically determining and generating configurations that can be implemented in a software testing environment. This process improves the operation of the underlying computer system by expediting software testing which reduces the amount of time that the computer system's resources are occupied for testing modifications to software projects.

In one embodiment, a device is configured to obtain project information that identifies a set of programs. For example, the project information may comprise text that identifies programs that are associated with a software project. The device is further configured to generate a program matrix that provides information about relationships among the programs. For example, the program matrix identifies self-loops and the programs that are called by each program. The device is further configured to input the program matrix into a regression machine learning model. The regression machine learning model is configured to receive a program matrix as an input and to output relationship information based on the received program matrix. The relationship information maps the set of programs to a spatial domain. In the spatial domain, the distance between a pair of programs corresponds with a level of impact the programs have on each other. The device is further configured to receive relationship information for the set of programs in response to inputting the program matrix into the regression machine learning model and to output the relationship information.

In another embodiment, a device is configured to receive an impact report request that comprises a program identifier for a program. For example, the program identified in the impact report request may be a program that a user is interested in modifying or removing from a software project. The device is further configured to identify the first program within a set of stored relationship information based on the program identifier. The relationship information comprises program identifiers for the plurality of programs and locations within a spatial domain that correspond with each of the program identifiers. The device is further configured to determine a location within the spatial domain for the program and to determine a distance threshold value. The distance threshold value corresponds with a distance away from the location of the program within the spatial domain. The device is further configured to determine distances between the location of the first program and locations of other programs, to compare the determined distances to the distance threshold value, and to identify one or more programs that are less than the distance threshold value away from the program. The device is further configured to generate an impact report that identifies the one or more programs that are less than the distance threshold value away from the program and to output the generated impact report.

In some embodiments, the device is further configured to identify a set of program identifiers for programs that are less than the distance threshold value away from the program and to input the set of identifiers into a test case machine learning model. The test case machine learning model is configured to receive a set of program identifiers and to output test case information based on the set of program identifiers. The test case information identifies a software testing configuration for testing the result of modifications to the program. The device is further configured to receive test case information that identifies a software testing configuration and to output the test case information.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
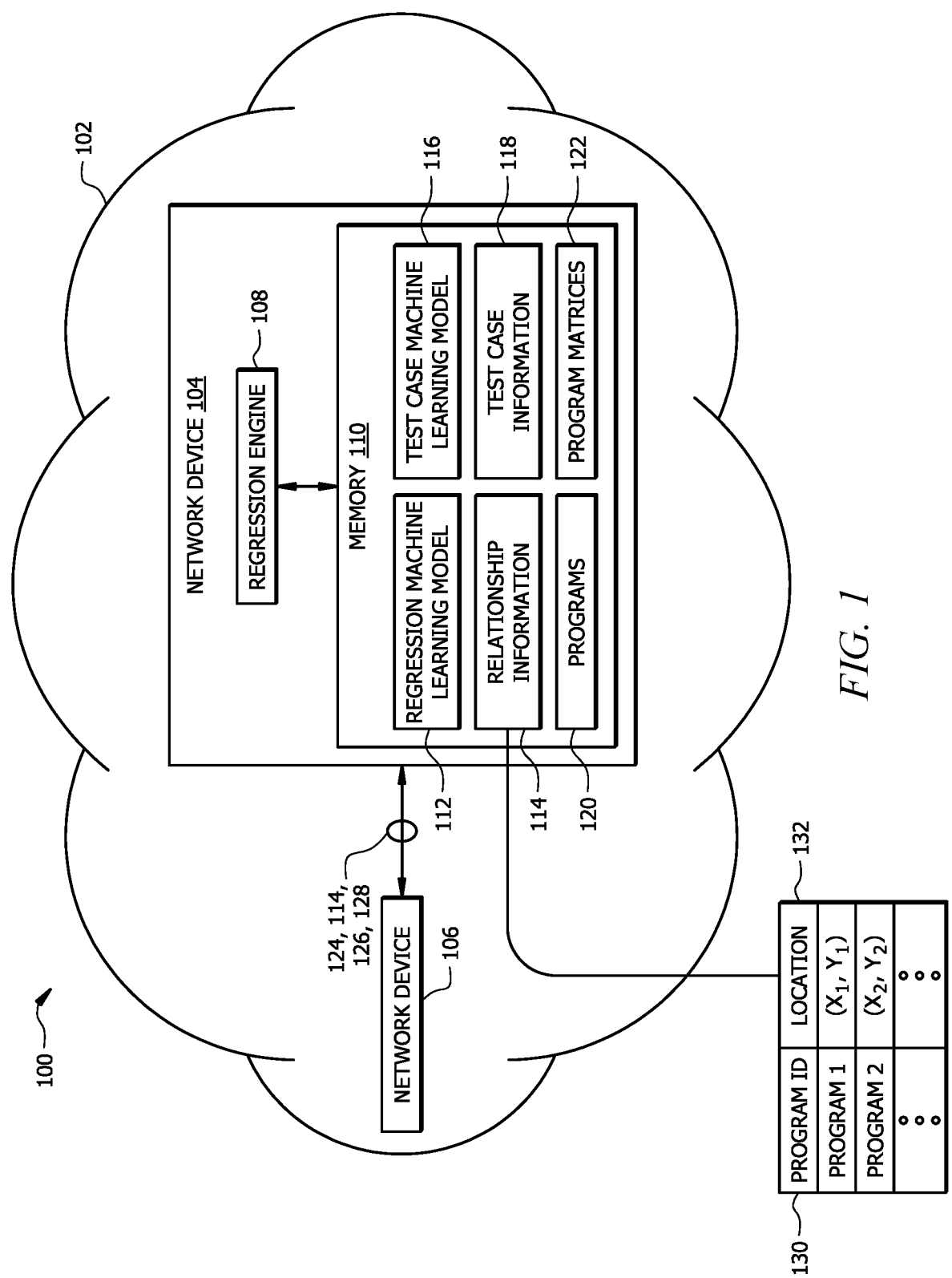
FIG. 1 is a schematic diagram of a software development system configured to perform a regression analysis for software development and management.

FIG. 1 is a schematic diagram of a software development system 100 configured to perform a regression analysis for software development and management. In one embodiment, the system 100 comprises a network device 104 that is in signal communication with one or more other network devices 106 in a network 102. The system 100 may be configured as shown or in any other suitable configuration.

The network 102 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 102 may be configured to support any suitable type of communication protocol as would be appreciated by one of ordinary skill in the art.

In one embodiment, the network device 104 comprises a regression engine 108 that is configured to receive project information 124 for a software project from another network device 106. Examples of other network devices 106 include, but are not limited to, computers, laptops, mobile devices (e.g. smartphones or tablets), servers, clients, or any other suitable type of device. The project information 124 identifies a set of programs 120 and may comprise a summary description for a software project, a functional description for a software project, a list of program identifiers 130 for programs 120 used in a software project, pseudocode, scripts, code, and/or any other suitable type of information associated with programs 120 for a software project.

In response to receiving the project information 124, the regression engine 108 is configured to generate a program matrix 122 based on the received project information 124. A program matrix 122 is a data structure that comprises information about relationships between a set of programs 120. The program matrix 122 associates a program 120 with other programs 120 that are called or used by that program 120. Additional information about a program matrix 122 is described in more detail below FIG. 3.

The regression engine 108 is further configured to input the program matrix 122 into a regression machine learning model 112 to obtain relationship information 114. The relationship information 114 can be used to determine how program modifications will affect other programs 120. Examples of program modifications include, but are not limited to, making changes to the code of a program or removing a program from a software project. The relationship information 114 comprises a mapping of programs 120 to a spatial domain 400. For example, the relationship information 114 may comprise a plurality of program identifiers 130 that are each mapped to a particular location 132 in a spatial domain 400. Examples of program identifiers 130 may include, but are not limited to, program names, alphanumeric codes, or any other suitable type of identifiers. An example of programs 120 mapped to a spatial domain 400 is described in more detail below in FIG. 4. In the spatial domain, the distance between a pair of programs 120 corresponds with a level of impact the programs 120 have on each other. The level of impact between a pair of programs 120 indicates how much modifications to one program 120 will affect the other program 120. A high-level of impact between a pair of programs 120 means that modification to one of the programs 120 will significantly affect the other program 120. For example, changes to a program 120 may cause the other program 120 to have errors or to stop working. A low-level of impact between a pair of programs 120 means that changes to one program 120 may have little to no effect on the other program 120. In the spatial domain, programs 120 that are closer to each other have a greater impact on each other compared to programs 120 that are further away from each other.

The regression machine learning model 112 is configured to receive a program matrix 122 as an input and to output relationship information 114 based on the input program matrix 122. Examples of the regression machine learning model 112 include, but are not limited to, a graphical convolutional network (GCN), a multi-layer perceptron, or any other suitable type of neural network model. For example, the regression machine learning model 112 may comprise a GCN and a Softmax function. In other examples, the regression machine learning model 112 may comprise any other suitable type or combination of functions. The regression machine learning model 112 identifies relationships between a set of programs 120 based on the information provided in a program matrix 122 without having to analyze the code for all of the programs 120. This process allows the regression machine learning model 112 to improve resource utilization and increase the throughput of the system 100 by reducing the amount of code that needs to be analyzed and interpreted.

In one embodiment, the regression engine 108 is further configured to receive an impact report request 126 from another network device 106, to generate an impact report 128, and to send the generated impact report 128 to the network device 106. The impact report request 126 may be used to request information about how modifications to program 120 will affect other programs 120. For example, the impact report request 126 may identify a program 120 that a user is interested in modifying or removing. The regression engine 108 is configured to use relationship information 114 to identify any programs 120 that are impacted by modifications to the program 120 identified in the impact report request 126. This process improves the operation of the system 100 by identifying potential issues that may result in downtime and reducing the amount of time that the system's resources are occupied for developing software projects.

The regression engine 108 may be further configured to use a test case machine learning model 116 to generate test case information 118. The test case information 118 comprises information about test cases that can be performed to test the result of modifications to one or more programs 120. For example, the test case information 118 may comprise a software testing configuration that can be implemented in a software development or test environment to test the result of modifications to one or more programs 120. The test case information 118 may comprise a text description, pseudocode, scripts, code, setting information, or any other suitable type of information for a software testing configuration. This process improves the operation of the system 100 by expediting software testing which reduces the amount of time that the system's resources are occupied for testing modifications to software projects.

The test case machine learning model 116 is configured to receive a set of program identifiers 130 for one or more programs 120 as an input and to output test case information 118 based on the input set of program identifiers 130. Examples of the test case machine learning model 116 include, but are not limited to, a multi-layer perceptron or any other suitable type of neural network model. The test case machine learning model 116 may be implemented using any suitable type or combination of functions.

The regression engine 108 is further configured to output an impact report 128 that comprises information about how modifications to a program 120 will affect other programs 120. For example, the impact report 128 may identify one or more other programs 120 that are affected by modifications to a program 120, test case information 118, and/or any other suitable type of information.

The network device 104 further comprises a memory 110 configured to store regression machine learning models 112, relationship information 114, test case machine learning models 116, test case information 118, programs 120, program matrices 122, and/or any other suitable type of data. In one embodiment, the memory 110 may be a device that is external from the network device 104. For example, the memory 110 may be a database, a repository, a data store, a server, a network attached storage (NAS) device, a computing device, a shared folder, or any other suitable type of network device. Additional information about the hardware configuration of the network device 104 is described in FIG. 6.

Regression Process

Figure 2:
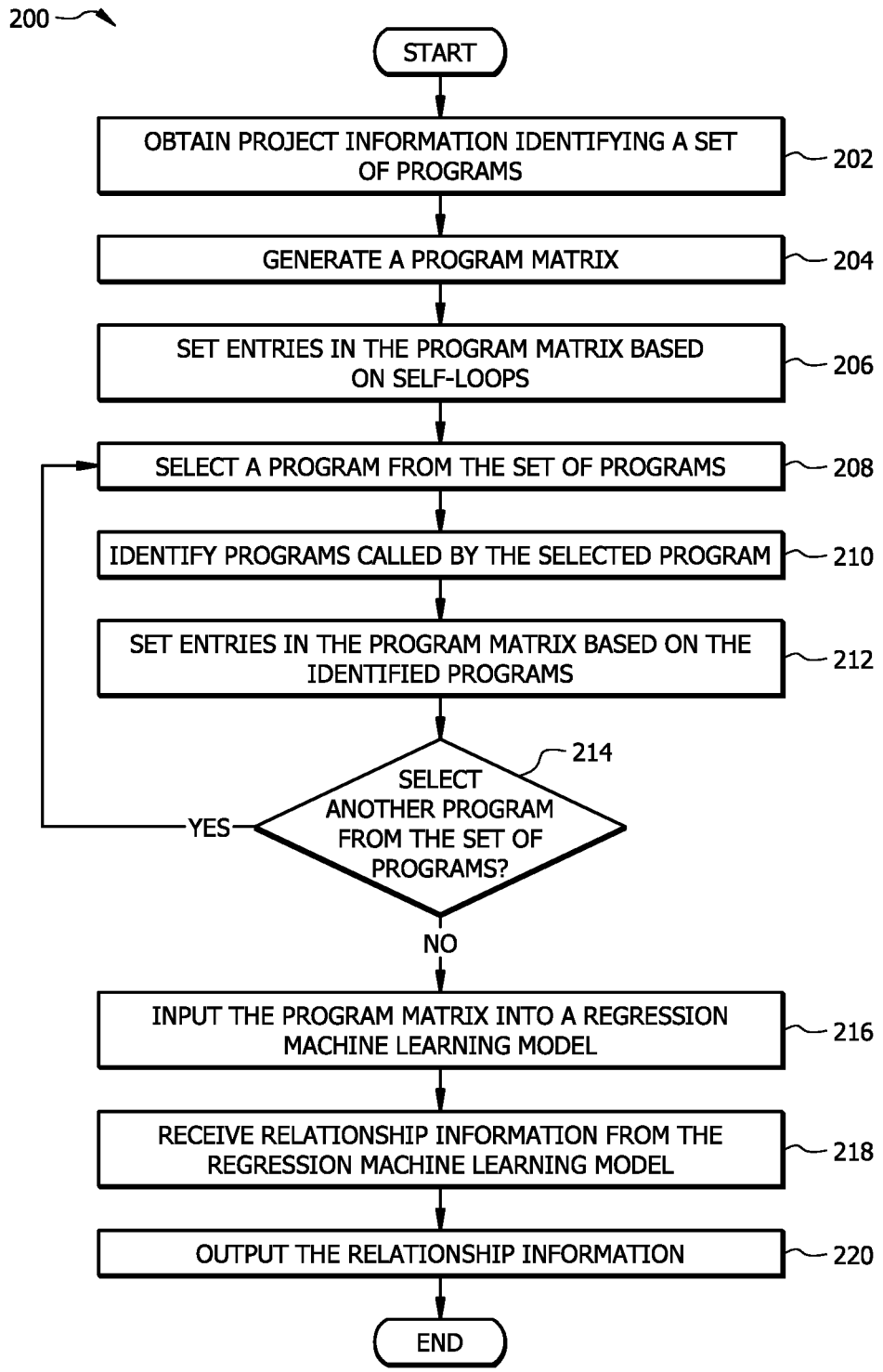
FIG. 2 is a flowchart of an embodiment of a regression method for software development.

FIG. 2 is a flowchart of an embodiment of a regression method 200 for software development. The network device 104 may employ method 200 to generate relationship information 114 for a set of programs 120. For example, the network device 104 may collect information about programs 120 that are associated with a software project and then use a regression machine learning model 112 to determine relationships between the programs 120 and the level of impact that each program 120 has other programs 120.

At step 202, the regression engine 108 obtains project information 124 identifying a set of programs 120. The project information 124 may be a text document that comprises a summary description for a software project, a functional description for a software project, a list of program identifiers 130 for programs 120 used in a software project, pseudocode, scripts, code, and/or any other suitable type of information associated with programs 120 for a software project. For example, the project information 124 may identify a plurality of programs 120 that are associated with a project. The project information 124 may identify the plurality of programs 120 by name, program identifier 130, or using any suitable type of identifier. The programs 120 identified in the project information 124 may be written in multiple programming languages. For example, the set of programs 120 may comprise a first program 120 that is written in a first programming language (e.g. Java) and a second program 120 that is written in a second programming language (e.g. C#). In other examples, the programs 120 may include programs 120 that are written in any other combination of programming languages.

Figure 3:
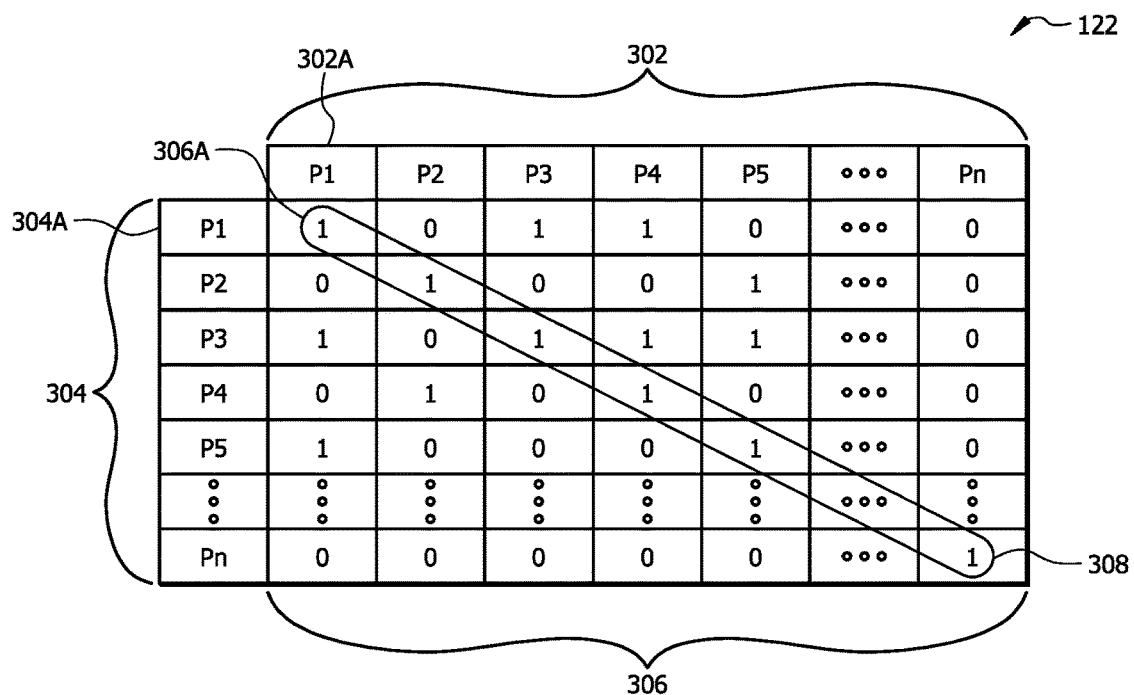
FIG. 3 is an example of a program matrix.

At step 204, the regression engine 108 generates a program matrix 122 for the set of programs 120. Referring to FIG. 3 as an example, a program matrix 122 is a data structure that comprises a plurality of columns 302 and a plurality of rows 304 that define a plurality of entries 306. Each row 304 corresponds with a program 120 from among the set of programs 120 identified in the project information 124. Similarly, each column 302 also corresponds with a program 120 from among the set of programs 120 identified in the project information 124. In one embodiment, the order of the programs 120 is the same for both the columns 302 and the rows 304 of the program matrix 122. For example, the programs 120 may be in ascending order alphabetically or numerically in both the columns 302 and the rows 304 of the program matrix 122. The regression engine 108 may initialize the entries 306 of the program matrix 122 to a known value by setting the entries 306 to a predefined value (e.g. zero).

Returning to FIG. 2 at step 206, the regression engine 108 sets entries 306 in the program matrix 122 based on self-loops. A self-loop is when a program 120 calls itself. In the program matrix 122, self-loops are located where a column 302 and a row 304 reference the same program 120. Returning to the example in FIG. 3, a self-loop for a program 120 called 'P1' corresponds with the entry 306A located at the intersection of the column 302A for program 'P1' and the row 304A for program 'P1.' After identifying the entry 306A corresponding with the self-loop for program 'P1,' the regression engine 108 sets the entry 306A with a value of one. The regression engine 108 repeats this process for all of the entries 306 that correspond with self-loops. In the example shown in FIG. 3, the entries 306 associated with self-loops occur along a diagonal 308 of the program matrix 122. This occurs because the program matrix 122 is symmetrical where the programs 120 are listed in the same order in both the columns 302 and the rows 304 of the program matrix 122.

After setting the entries 306 corresponding with self-loops, the regression engine 108 then begins setting entries 306 in the program matrix 122 to identify relationships among the set of programs 120 identified in the project information 124. Returning to FIG. 2 at step 208, the regression engine 108 selects a program 120 from the set of programs 120. Here, the regression engine 108 may iteratively select programs 120 from the set of programs 120 to begin identifying relationships between the selected program 120 and other programs 120 within the set of programs 120. For example, the regression engine 108 may select programs 120 in the order they appear in the rows 304 of the program matrix 122. Returning to the example in FIG. 3, the regression engine 108 may select the program 'P1' on a first iteration. The regression engine 108 may the select program 'P2' on the next iteration, and so on.

Returning to FIG. 2 at step 210, the regression engine 108 identifies programs 120 called by the selected program 120. For example, the regression engine 108 may execute the selected program 120 to identify other programs 120 that are called by the program 120 while it executes. As another example, the regression engine 108 may analyze the code for the selected program 120 to identify any other programs 120 that are called by the program 120 when it executes. In other examples, the regression engine 108 may employ any other suitable technique for determining programs 120 that are called by the selected program 120.

At step 212, the regression engine 108 sets entries 306 in the program matrix 122 based on the identified programs 120. Returning to the example in FIG. 3, on the first iteration, the regression engine 108 may select the program 'P1.' The regression engine 108 may then execute program 'P1' or analyze the code for program 'P1' to identify other programs 120 that are called by program 'P1.' In this example, programs 'P3' and 'P4' are called by program 'P1.' After identifying the programs 120 called by program 'P1,' the regression engine 108 then sets entries 306 in the row 304 for program 'P1' that corresponds with programs 'P3' and 'P4' with a value of one.

Returning to FIG. 2 at step 214, the regression engine 108 determines whether to select another program 120 from among the set of programs 120. Here, the regression engine 108 determines whether all of the programs 120 from the set of programs 120 have been selected to populate the program matrix 122. The regression engine 108 determines to select another program 120 when one or more programs 120 from the set of programs 120 have not been selected. In this case, the regression engine 108 returns to step 208 to select another program 120 from among the set of programs 120. Otherwise, the regression engine 108 proceeds to step 216 in response to determining not to select another program 120 from among the set of programs 120.

Figure 4:
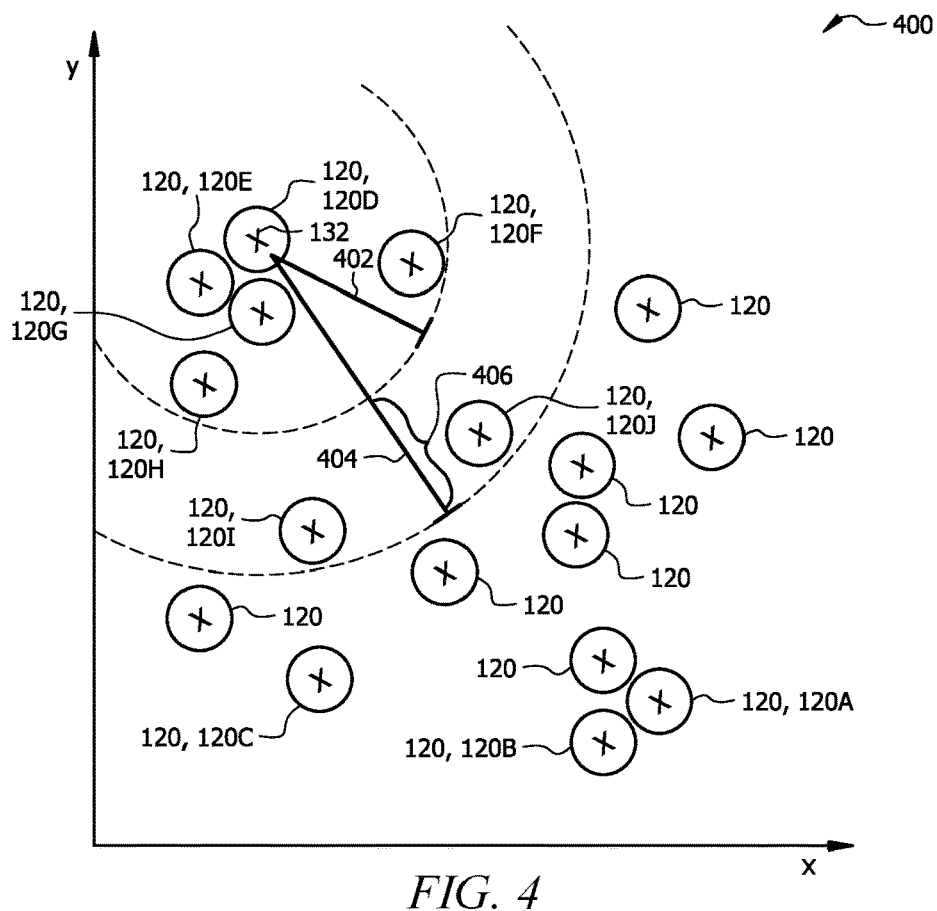
FIG. 4 is an example of programs in a spatial domain.

After populating the program matrix 122, the regression engine 108 uses the regression machine learning model 112 to generate relationship information 114. At step 216, the regression engine 108 inputs the program matrix 122 into the regression machine learning model 112. At step 218, the regression engine 108 receives relationship information 114 from the regression machine learning model 112 in response to inputting the program matrix 122 into the regression machine learning model 112. The relationship information 114 comprises a mapping of programs 120 from the set of programs 120 to a spatial domain 400. For example, the relationship information 114 may comprise program identifiers 130 for the set of programs 120 that are each mapped to a location 132 in a spatial domain 400. Referring to FIG. 4 as an example, a plurality of programs 120 is mapped in a spatial domain 400. Each program 120 is mapped to a particular location 132 within the spatial domain 400 in accordance with generated relationship information 114. In the spatial domain 400, the distance between a pair of programs 120 corresponds with a level of impact between the pair of programs 120. Programs 120 that are located closer to each other, for example, programs 120A and 120B, have a greater impact on each other compared to programs 120 that are located further away from each other, for example, programs 120A and 120C. In one embodiment, the distance between a pair of programs 120 in the spatial domain 400 also corresponds a probability for how similar the pair of programs 120 are to each other or a probability that corresponds with a level of impact. For example, a higher probability is associated with programs 120 that are located closer to each other, for example, programs 120A and 120B, compared to programs 120 that are located further away from each other, for example, programs 120A and 120C.

Returning to FIG. 2 at step 220, the regression engine 108 outputs the relationship information 114. In one example, the regression engine 108 outputs the relationship information 114 by storing the relationship information 114 in a memory (e.g. memory 110). In this case, the regression engine 108 stores the relationship information 114 so that it can be used and referenced later by other processes. For example, the regression engine 108 may use the relationship information 114 to generate an impact report 128 using a process similar to the process described in FIG. 5. As another example, the regression engine 108 may output the relationship information 114 by generating a graphical representation (e.g. a graph) of the relationship information 114 and presenting the graphical representation on a display. For example, the regression engine 108 may display the graphical representation of the relationship information 114 on a graphical user display. As another example, the regression engine 108 may output the relationship information 114 by sending the relationship information 114 to a network device 106. In this case, the network device 106 receives the relationship information 114 that corresponds with the project information 124 that was initially provided to the regression engine 108.

Impact Report Generation Process

Figure 5:
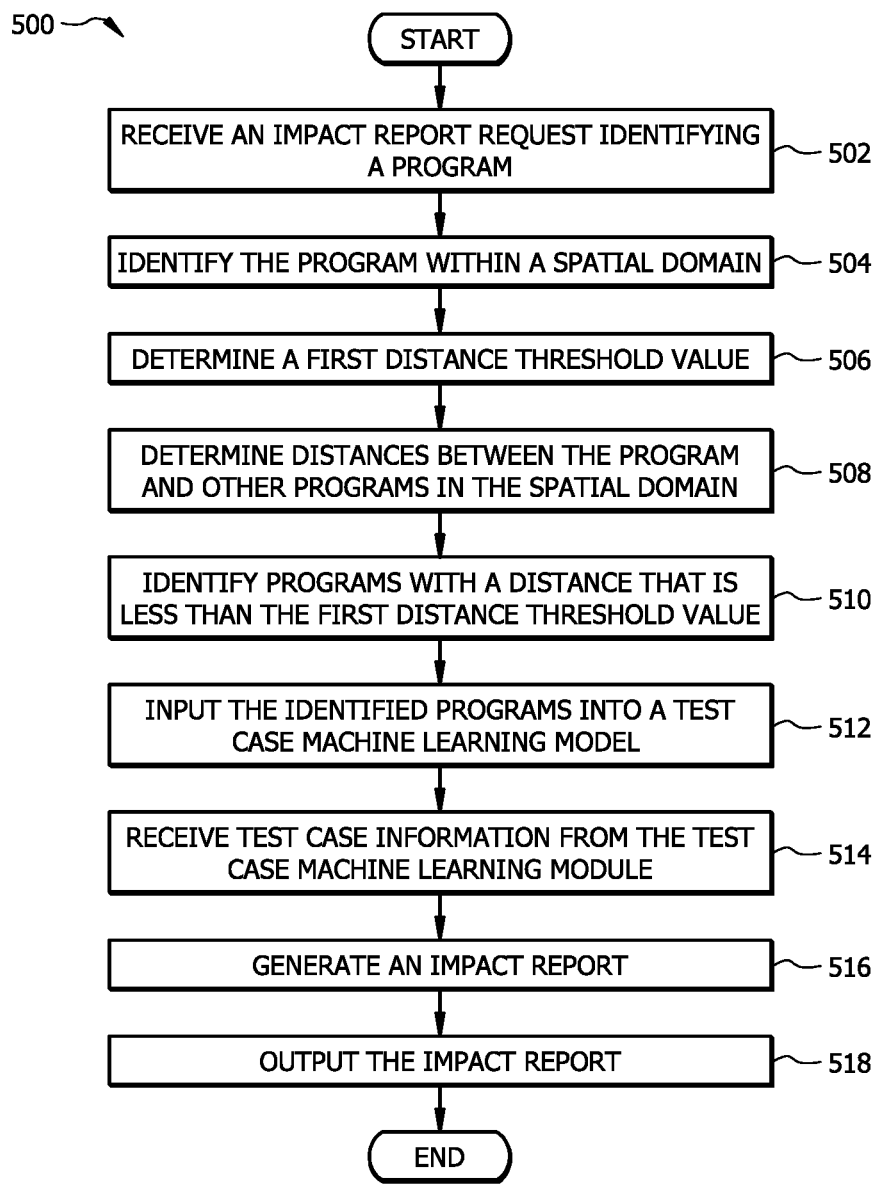
FIG. 5 is a flowchart of an embodiment of an impact report generation method.

FIG. 5 is a flowchart of an embodiment of an impact report generation method 500. The network device 104 may employ method 500 to generate an impact report 128 that identifies programs 120 that are affected by modifications to a program 120, information about test cases that can be performed to test the result of modifications to a program 120, and/or any other suitable type of information based on modifications to a program 120.

At step 502, the regression engine 108 receives an impact report request 126 that identifies a program 120. For example, the impact report request 126 may identify a program 120 that a user is interested in modifying or removing. The impact report request 126 may identify the program 120 using a program identifier 130 (e.g. a program name) or any other suitable type of identifier.

At step 504, the regression engine 108 identifies the program 120 within a spatial domain 400. The regression engine 108 may use relationship information 114 to determine the location 132 of the identified program 120 within a spatial domain 400. For example, the regression engine 108 may use a program identifier 130 for the program 120 as a search token to determine whether the program 120 is present within the relationship information 114. After determining that the program 120 is present within the relationship information 114, the regression engine 108 determines a location 132 within the spatial domain 400 that is associated with the program 120. Returning to the example in FIG. 4, the regression engine 108 may receive a program identifier 130 that corresponds with a program 120D. The regression engine 108 identifies the program identifier 130 within the relationship information 114 and determines the location 132 of the program 120D within the spatial domain 400.

Returning to FIG. 5 at step 506, the regression engine 108 determines a first distance threshold value 402. The first distance threshold value 402 corresponds with a first distance away from the location 132 of the program 120. The first distance threshold value 402 represents a minimum level of impact for identifying programs 120 that have a relationship with the identified program 120. An example of the first distance threshold value 402 is shown in FIG. 4. In one embodiment, the first distance threshold value 402 may be user-defined. For example, the first distance threshold value 402 may be provided in the impact report request 126. In other examples, the first distance threshold value 402 may be a predetermined value.

At step 508, the regression engine 108 determines distances between the program 120 and other programs 120 in the spatial domain 400. Here, the regression engine 108 uses location information from the relationship information 114 to determine distances between the program 120 and other programs 120 within the spatial domain 400. For example, the regression engine 108 may determine a Euclidian distance between the location 132 of the program 120 and the location 132 of other programs 120. In other examples, the regression engine 108 may determine the distance between the location 132 of the program 120 and the location 132 of other programs 120 using any other suitable technique.

At step 510, the regression engine 108 identifies programs 120 with a distance that is less than the first distance threshold value 402. For example, the regression engine 108 may compare the determined distances to the first distance threshold value 402 to identify programs 120 with a distance that is less than the first threshold value 402 away from the location 132 of the program 120. Returning to the example in FIG. 4, the regression engine 108 identifies programs 120E, 120F, 120G, and 120H as being within the first distance threshold value 402. The programs 120 within the first distance threshold value 402 may also be referred to as programs 120 that are within a primary level of impact for the program 120. This means that these programs 120 will experience the greatest impact as a result of modifications to the program 120.

In some embodiments, the regression engine 108 may also identify other programs 120 that fall within a secondary level of impact for the program 120. For example, the regression engine 108 may determine a second distance threshold value 404. The second distance threshold value 404 corresponds with a second distance away from the location 132 of the program 120. The second distance threshold value 404 is greater than the first distance threshold value 402. The second distance threshold value 404 may be user-defined. For example, the second distance threshold value 404 may also be provided in the impact report request 126. In other examples, the second distance threshold value 404 may be a predetermined value. After determining the second distance threshold value 404, the regression engine 108 then determines a distance threshold range 406 between the first distance threshold value 402 and the second distance threshold value 404. The regression engine 108 may then use the determined distance threshold range 406 to identify any programs 120 that fall within the secondary impact level for the program 120. The regression engine 108 compares the distances between the program 120 and the other programs 120 within the spatial domain to identify any programs 120 within the distance threshold range 406. Returning to the example in FIG. 4, the regression engine 108 identifies programs 102I and 120J as being within the distance threshold range 406. In other words, the regression engine 108 determines that programs 120I and 120J have a distance that is greater than the first distance threshold value 402 and is less than the second distance threshold value 404. In this example, programs 120I and 120J may be referred to as programs 120 within the secondary level of impact for the program 120. This means that these programs 120 will also be affected by modifications to the program 120, however, the impact they will experience will be less severe compared to programs 120 within the primary impact level. The regression engine 108 may repeat this process to identify programs 120 within any other level of impact for the program 120.

Returning to FIG. 5 at step 512, the regression engine 108 inputs the identified programs 120 into the test case machine learning model 116. For example, the regression engine 108 may identify the program identifiers 130 for the programs 120 with a distance less than the first distance threshold value 402. The regression engine 108 may then use these program identifiers 130 as an input to the test case machine learning model 116.

At step 514, the regression engine 108 receives test case information 118 in response to inputting the identified programs 120 into the test case machine learning model 116. The test case information 118 comprises information about test cases that can be performed to test the result of modifications to the program 120. For example, the test case information 118 may comprise a software testing configuration that can be implemented in a software development or test environment to test the result of modifications to the program 120. The test case information 118 may comprise a text description, pseudocode, scripts, code, setting information, or any other suitable type of information for a software testing configuration.

At step 516, the regression engine 108 generates an impact report 128. The impact report 128 may identify the programs 120 that are affected by modifications to the program 120, the test case information 118, and/or any other suitable type of information. For example, the generated impact report 128 may identify the programs 120 with a distance less than the first distance threshold value 402 and/or programs 120 with a distance between the first distance threshold value 402 and the second distance threshold value 404. As another example, the generated impact report 128 may comprise information about a software testing configuration for testing the result of modifications to the program 120.

At step 518, the regression engine 108 outputs the generated impact report 128. For example, the regression engine 108 may output the generated impact report 128 by sending the generated impact report 128 to the network device 106 that requested the impact report 128. In one embodiment, the regression engine 108 may be configured to output the test case information 118 to configure a software testing environment. For example, the regression engine 108 may configure a software testing environment based on the determined software configuration. In this case, the regression engine 108 may use scripts, code, setting information, or any other suitable type of information associated with the determined software configuration for configuring the software test environment. In other examples, the regression engine 108 may be configured to send the test case information 118 to the network device 106 for configuring a software test environment.

Network Device Hardware Configuration

Figure 6:
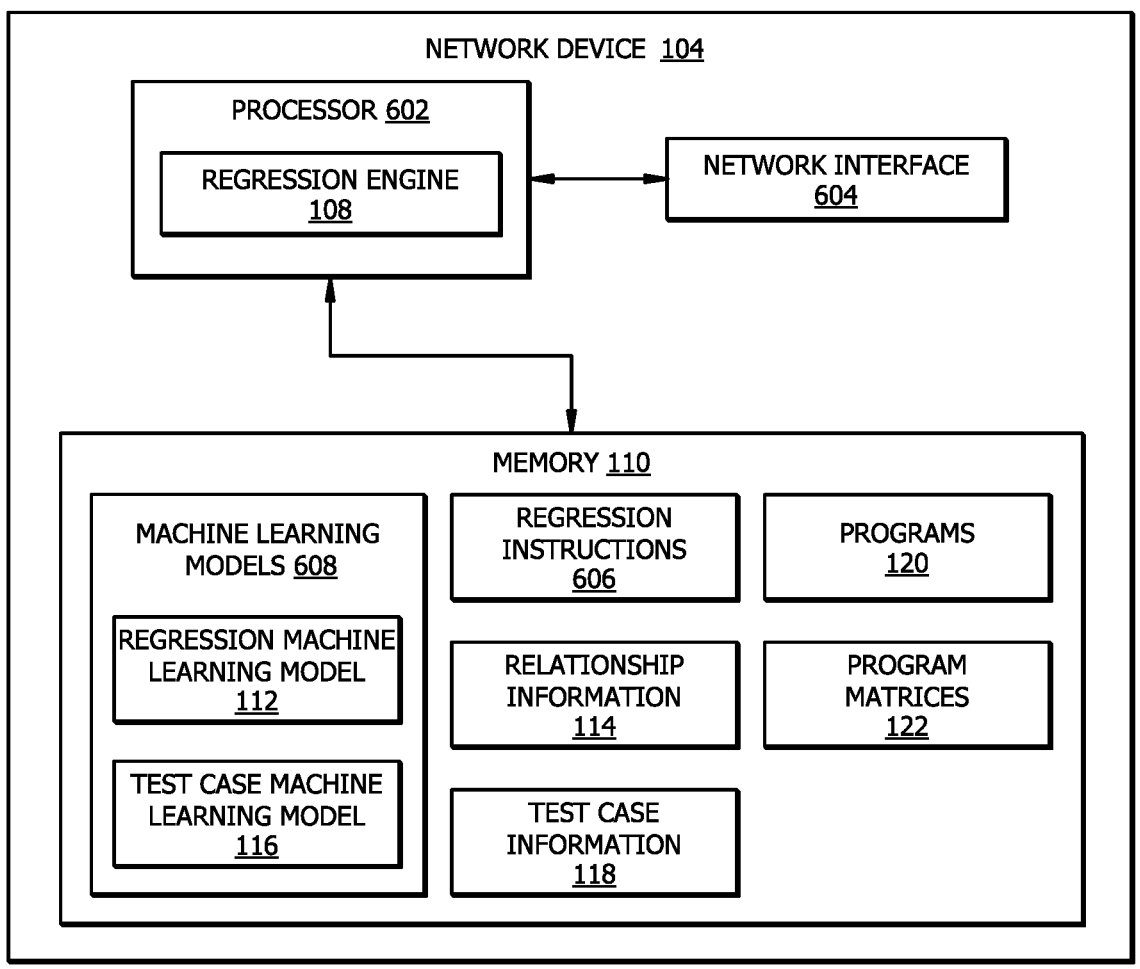
FIG. 6 is a schematic diagram of an embodiment of a device configured to perform a regression analysis for software development and management.

FIG. 6 is a schematic diagram of an embodiment of a device (e.g. network device 104) configured to perform a regression analysis for software development and management. The network device 104 comprises a processor 602, a memory 110, and a network interface 604. The network device 104 may be configured as shown or in any other suitable configuration.

The processor 602 comprises one or more processors operably coupled to the memory 110. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 110. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a regression engine 108. In this way, processor 602 may be a special-purpose computer designed to implement the functions disclosed herein. In an embodiment, the regression engine 108 is implemented using logic units, FPGAs, ASICs, DSPs, or any other suitable hardware. The regression engine 108 is configured to operate as described in FIGS. 1, 2, and 5. For example, the regression engine 108 may be configured to perform the steps of method 200 and 500 as described in FIGS. 2 and 5, respectively.

The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM).

The memory 110 is operable to store regression instructions 606, machine learning models 608, relationship information 114, test case information 118, programs 120, program matrices 122, and/or any other data or instructions. The regression instructions 606 may comprise any suitable set of instructions, logic, rules, or code operable to execute the regression engine 108. The machine learning models 608, relationship information 114, the test case information 118, programs 120, and the program matrices 122 are configured similar to the machine learning models 608, relationship information 114, the test case information 118, programs 120, and the program matrices 122 described in FIGS. 1-5, respectively. For example, the machine learning models 608 may comprise the regression machine learning model 112 and the test case machine learning model 116 described in FIGS. 1-5.

The network interface 604 is configured to enable wired and/or wireless communications. The network interface 604 is configured to communicate data between the network device 104 and other devices (e.g. network devices 106), systems, or domain. For example, the network interface 604 may comprise a WIFI interface, a LAN interface, a WAN interface, a modem, a switch, or a router. The processor 602 is configured to send and receive data using the network interface 604. The network interface 604 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A software management device, comprising:
a memory operable to store relationship information that comprises a mapping for a plurality of programs to a spatial domain, wherein:
the relationship information comprises locations within the spatial domain; and
a distance between a pair of programs in the spatial domain corresponds with a level of impact between the pair of programs; and
a processor operably coupled to the memory, configured to:
determine a location within the spatial domain for a first program;
determine a first distance threshold value, wherein the first distance threshold value corresponds with a first distance away from the location of the first program within the spatial domain;
determine distances between the location of the first program and locations of other programs from the plurality of programs;
compare the determined distances to the first distance threshold value; and
identify one or more programs from the plurality of programs that are less than the first distance threshold value.

2. The device of claim 1, wherein:
the processor is further configured to:
determine a second distance threshold value, wherein:
the second distance threshold value corresponds with a second distance away from the location of the first program within the spatial domain; and
the second distance is greater than the first distance threshold value;

determine a distance threshold range between the first distance threshold value and the second distance threshold value;

compare the determined distances to the distance threshold range; and identify one or more programs from the plurality of programs that are within the distance threshold range.

3. The device of claim 1, wherein:

the memory is further operable to store a machine learning model; and the processor is further configured to:

identify a set of program identifiers for the one or more programs from the set of programs that are less than the first distance threshold value;

input the set of program identifiers into the machine learning model;

receive test case information that identifies a software testing configuration; and output the test case information.

4. The device of claim 3, wherein outputting the test case information comprises configuring a software test environment using the software testing configuration.

5. The device of claim 3, wherein outputting the test case information comprises sending the test case information to a network device.

6. The device of claim 3, wherein the test case information further comprises a text description for the software testing configuration.

7. The device of claim 1, wherein the processor is further configured to generate an impact report that lists the identified one or more programs.

8. A software developing method, comprising:

storing relationship information that comprises a mapping for a plurality of programs to a spatial domain, wherein:

the relationship information comprises locations within the spatial domain; and a distance between a pair of programs in the spatial domain corresponds with a level of impact between the pair of programs;

determining a location within the spatial domain for a first program;

determining a first distance threshold value, wherein the first distance threshold value corresponds with a first distance away from the location of the first program within the spatial domain;

determining distances between the location of the first program and locations of other programs from the plurality of programs;

comparing the determined distances to the first distance threshold value; and identifying one or more programs from the plurality of programs that are less than the first distance threshold value.

9. The method of claim 8, further comprising:

determining a second distance threshold value, wherein:

the second distance threshold value corresponds with a second distance away from the location of the first program within the spatial domain; and the second distance is greater than the first distance threshold value;

determining a distance threshold range between the first distance threshold value and the second distance threshold value;

comparing the determined distances to the distance threshold range; and identifying one or more programs from the plurality of programs that are within the distance threshold range.

10. The method of claim 8, further comprising:

identifying a set of program identifiers for the one or more programs from the set of programs that are less than the first distance threshold value;

inputting the set of program identifiers into a machine learning model;

receiving test case information that identifies a software testing configuration; and outputting the test case information.

11. The method of claim 10, wherein outputting the test case information comprises configuring a software test environment using the software testing configuration.

12. The method of claim 10, wherein outputting the test case information comprises sending the test case information to a network device.

13. The method of claim 10, wherein the test case information further comprises a text description for the software testing configuration.

14. The method of claim 10, further comprising generating an impact report that lists the identified one or more programs.

15. A computer program comprising executable instructions stored in a non-transitory computer readable medium that when executed by a processor causes the processor to:

store in a memory relationship information that comprises a mapping for a plurality of programs to a spatial domain, wherein:

the relationship information comprises locations within the spatial domain; and a distance between a pair of programs in the spatial domain corresponds with a level of impact between the pair of programs;

determine a location within the spatial domain for a first program;

determine a first distance threshold value, wherein the first distance threshold value corresponds with a first distance away from the location of the first program within the spatial domain;

determine distances between the location of the first program and locations of other programs from the plurality of programs;

compare the determined distances to the first distance threshold value; and identify one or more programs from the plurality of programs that are less than the first distance threshold value.

16. The computer program of claim 15, further comprising instructions that when executed by the processor causes the processor to:

determine a second distance threshold value, wherein:

the second distance threshold value corresponds with a second distance away from the location of the first program within the spatial domain; and the second distance is greater than the first distance threshold value;

determine a distance threshold range between the first distance threshold value and the second distance threshold value;

compare the determined distances to the distance threshold range; and identify one or more programs from the plurality of programs that are within the distance threshold range.

17. The computer program of claim 15, further comprising instructions that when executed by the processor causes the processor to:

identify a set of program identifiers for the one or more programs from the set of programs that are less than the first distance threshold value;

input the set of program identifiers into a machine learning model;

receive test case information that identifies a software testing configuration; and output the test case information.

18. The computer program of claim 17, wherein outputting the test case information comprises configuring a software test environment using the software testing configuration.

19. The computer program of claim 17, wherein the test case information further comprises a text description for the software testing configuration.

20. The computer program of claim 17, further comprising instructions that when executed by the processor causes the processor to generate an impact report that lists the identified one or more programs.

\* \* \* \* \*